US005817734A

United States Patent [19]

Pantone et al.

[11] Patent Number: 5,817,734

[45] Date of Patent: Oct. 6, 1998

[54] PREPOLYMERS WITH LOW TDI CONTENT

[75] Inventors: Richard S. Pantone, New Martinsville, W. Va.; Peter H. Markusch, McMurray, Pa.

[73] Assignee: Bayer Corporation, Pittsburgh, Pa.

[21] Appl. No.: 963,179

[22] Filed: Nov. 3, 1997

[51] Int. Cl.[6] .................. C08G 18/10

[52] U.S. Cl. .................. 528/76; 528/59; 521/159; 252/182.22

[58] Field of Search .................. 252/182.22; 528/59, 528/76; 521/159

[56] References Cited

U.S. PATENT DOCUMENTS

| | | | |
|---|---|---|---|
| 3,115,481 | 12/1963 | Pigott et al. | 260/77.5 |
| 3,183,112 | 5/1965 | Gemassmer | 106/316 |
| 3,248,372 | 4/1966 | Bunge | 260/77.5 |
| 3,384,624 | 5/1968 | Heiss | 260/77.5 |
| 3,600,358 | 8/1971 | Taub | 260/75 NH |
| 3,637,599 | 1/1972 | Ditty | 260/75 NT |
| 3,766,148 | 10/1973 | Taub | 260/77.5 AM |
| 3,789,032 | 1/1974 | Hoeschele et al. | 260/75 NT |
| 3,883,577 | 5/1975 | Rabizzoni et al. | 260/471 C |
| 3,963,681 | 6/1976 | Kaneko et al. | 260/77.5 AM |
| 3,997,514 | 12/1976 | Kogon | 260/77.5 AM |
| 4,061,662 | 12/1977 | Marans et al. | 560/26 |
| 4,098,773 | 7/1978 | Illers et al. | 528/65 |
| 4,544,763 | 10/1985 | Narayan | 560/26 |
| 4,683,279 | 7/1987 | Milligan et al. | 528/27 |
| 5,051,152 | 9/1991 | Siuta et al. | 203/49 |
| 5,202,001 | 4/1993 | Starner et al. | 203/49 |
| 5,646,230 | 7/1997 | Pantone et al. | 528/64 |

*Primary Examiner*—Rachel Gorr

*Attorney, Agent, or Firm*—Joseph C. Gil; N. Denise Brown

[57] ABSTRACT

This invention relates to novel liquid toluene diisocyanate/polyether/polymethylene poly(phenylisocyanate) prepolymers having an NCO content of from about 2 to 20%, a viscosity or about 10,000 mPa.s or less at 25° C., and which contains about 1.0% or less of monomeric TDI. This invention also relates to a process for the preparation of these liquid toluene diisocyanate/polyether/polymethylene poly (phenylisocyanate) prepolymers.

20 Claims, No Drawings

PREPOLYMERS WITH LOW TDI CONTENT

BACKGROUND OF THE INVENTION

This invention relates to liquid, low-viscosity prepolymers based on toluene diisocyanate (TDI) having an NCO content of from about 2 to 20%, a viscosity of about 10,000 mPa.s or less at room temperature and containing about 1.0% or less of monomeric (free) TDI. The present invention also relates to a process for the preparation of these liquid, low-viscosity prepolymers.

Various types of isocyanate prepolymers are known and disclosed in, for example, U.S. Pat. Nos. 3,115,481, 3,600,358, 3,766,148, 3,789,032, 3,963,681, 3,997,514 and 4,098,733. Isocyanate prepolymers are commonly used to produce polyurethane and/or polyurea products such as, for example, elastomers, foams, adhesives, caulkings, sealants, binders, etc.

TDI based prepolymers are particularly desirable as these result in lower viscosities at a given NCO in comparison to other diisocyanates. Some of the disadvantages commonly associated with the known isocyanate prepolymers, particularly those prepolymers based on TDI, include the high vapor pressure of TDI, and potential industrial hygiene issues related to the vapor pressure and large quantities of monomeric TDI. Various methods to reduce the monomeric diisocyanate contents of isocyanate prepolymers are known and described in, for example, U.S. Pat. Nos. 3,183,112, 3,248,372, 3,384,624, 3,883,577, 4,061,662, 4,683,279.

Polyurethane casting compositions are described in U.S. Pat. No. 3,211,701. These comprise the reaction product of an isocyanate-terminated interpolymer with an organic crosslinking agent (which may be a polyamine or a polyhydric alcohol). First, a hydroxyl-terminated polyester urethane is formed by reacting a polyester having a molecular weight of 900 to 1200 with an organic diisocyanate, including mixtures of the 2,4- and 2,6-isomers of toluene diisocyanate. These hydroxyl-terminated polyester urethanes exhibit softening points of from about 38° to about 40° C. The hydroxyl-terminated polyester urethane is then reacted with an excess of an organic diisocyanate (preferably naphthylene-1,5-diisocyanate, p-phenylene diisocyanate or diphenylmethane-4,4'-diisocyanate) to form the isocyanate-terminated interpolymer. These isocyanate-terminated interpolymers are solids at room temperatures.

Isocyanate-terminated prepolymers are broadly described in U.S. Pat. No. 3,963,681. These prepolymers may be cured with an aromatic or aliphatic polyamine or polyol. Suitable isocyanates for the prepolymers include aromatic or aliphatic diisocyanates and triisocyanates. The polyurethane/urea elastomers of the '681 patent are based on mixtures of polytetramethylene glycol ethers (Polymegs) of two different molecular weights (one high and one low, with ca. 1,000 to 4,500 average MW of the blend). These blends of polyols are described as resulting in better high temperature and dynamic properties than a single Polymeg having the same average MW as the above blend.

Prepolymers and polyurethane/ureas produced therefrom are described in U.S. Pat. Nos. 3,766,148 and 3,600,358. The prepolymers in both patents are based on methylene bis(4-phenylisocyanate). The '148 patent describes chain extending these methylene bis(4-phenyliso-cyanate) based prepolymers with MDA (4,4'-methylenedianiline) to form poly-urethane/ureas. U.S. Pat. No. 3,600,358 describes prepolymers based on methylene bis(4-phenylisocyanate) with neopentyl glycol adipate (or other esters of neopentyl glycol). These prepolymers are subsequently chain extended with aromatic diamines, preferably MDA, to form polyurethane/urea elastomers.

U.S. Pat. No. 3,115,481 also describes polyurethane/urea elastomers. These elastomers are formed by first preparing foams and subsequently crushing the cells in a heated press. This invention uses prepolymers wherein an aromatic isocyanate is present on the prepolymer ends. This increases the reactivity of the isocyanate prepolymers such that they are suitable for reaction with water to form foams. However, this high reactivity makes this type of prepolymer too fast to process with diamine chain extenders to form cast elastomers.

Polyurethane/urea elastomers are also described in U.S. Pat. No. 3,789,032. These elastomers are aromatic isocyanate terminated prepolymers like those of the '481 patent. The elastomers produced in this reference are also produced by reacting the aromatic isocyanate terminated prepolymers with water. Increased reactivity is also a problem in these prepolymers.

Isocyanate prepolymers having good storage stability and based on a mixture of polyisocyanates with a reactive hydrogen containing material are disclosed in U.S. Pat. No. 3,637,599. Suitable polyisocyanates include polyphenyl polymethyl polyisocyanate and toluene diisocyanates, and suitable reactive hydrogen containing materials have molecular weights of from 500 to 6000. The working examples only use polyesters as the reactive hydrogen containing material for preparing the isocyanate prepolymers. The produced prepolymers have a high free TDI monomer content and are solids at room temperature.

U.S. Pat. No. 4,098,773 describes prepolymers that are prepared from linear polyols and aliphatic isocyanates, cycloaliphatic isocyanates, aliphatic-aromatic isocyanates, sterically hindered aromatic isocyanates or 4,4'-methylene bis(phenylisocyanate) where the OH:NCO ratio is 1:1.1 to 1:2. A symmetrical aromatic diisocyanate is subsequently added to the prepolymer, and the prepolymers are chain extended with symmetric diols to prepare polyurethanes with high softening points. The working examples of the '773 patent use 4,4'-diphenylmethane diisocyanate, isomeric mixtures of toluene diisocyanate and hexamethylene diisocyanate, and typically a polyester as the linear polyol. Only Example 8 uses a polyether, more specifically Polymeg 2000. The prepolymer of this example exhibits the following properties: an NCO content of 7.0% and a viscosity of 14,370 mPa.s at 25° C. The viscosity of this particular prepolymer clearly exceeds that required by those of the present invention.

U.S. Pat. No. 3,997,514 describes isocyanate terminated prepolymers prepared from mixtures of aromatic and aliphatic diisocyanates. These prepolymers comprise the reaction product of excess polyesters or polyether polyols with an aromatic diisocyanate to form a hydroxyl terminated prepolymer. This OH terminated prepolymer subsequently reacts with an excess of aliphatic diisocyanate to form a diisocyanate terminated prepolymer. These diisocyanate terminated prepolymers have high viscosities at temperatures as high as 100° C., and at room temperature, either have very high viscosities or may be solids. These prepolymers of U.S. Pat. No. 3,997,514 can be prepared in either a one-step or two-step process.

Among the various processes which have been developed in attempts to reduce the quantity of unreacted monomeric isocyanate contents in various isocyanate prepolymers are processes and/or methods using falling film evaporators, wiped film evaporators, distillation techniques, various solvents, molecular sieves, etc . . . Most of these processes and/or methods require an additional processing step in which the unreacted diisocyanate is removed. For example, U.S. Pat. No. 4,061,662 removes unreacted TDI from an isocyanate by contacting the isocyanate with molecular sieves. Additional processing steps require additional time to yield the desired prepolymer and increase the cost of the prepolymer.

Processes related to removing excess isocyanate from isocyanate prepolymers by a solvent and/or extraction technique include those described in, for example, U.S. Pat. Nos. 3,248,372, 3,384,624 and 3,883,577. The '372 patent discloses heating the isocyanate prepolymer under alkaline conditions to make a polymeric organic polyisocyanate soluble in organic solvent and containing less than about 1% of monomer. The excess diisocyanate is then separated by subjecting the mixture to a vacuum treatment or extraction with a solvent. Benzyl alcohol is disclosed as a suitable component to remove excess monomeric TDI in U.S. Pat. No. 3,384,624. The '577 patent discloses acetonitrile as a suitable solvent medium to remove the volatile diisocyanate.

It is also possible to distill an isocyanate prepolymer to remove the unreacted diisocyanate according to U.S. Pat. No. 4,385,171. It is necessary to use a compound which is only partially miscible with the prepolymer and has a higher boiling point that of the diisocyanate to remove the unreacted diisocyanate.

U.S. Pat. Nos. 3,183,112, 4,683,279, 5,051,152 and 5,202,001 describe falling film and/or wiped film evaporation. In U.S. Pat. No. 3,183,112, the unreacted diisocyanate is removed from an isocyanate prepolymer by allowing the prepolymer reaction mixture to flow as a thin film and heating to about 150° C., while agitating the film. Advantageously, a solvent such as o-dichlorobenzene may be pumped into the bottom of the falling film evaporator to aid in removal of the unreacted diisocyanate.

Urethane-linked mixtures of 2,4- and 2,6-TDI mixtures which exhibit low melting points are disclosed by U.S. Pat. No. 4,683,279. TDI is reacted with low molecular weight polyols having from 4 to 10 carbon atoms. The excess diisocyanate may then be removed by distillation using a wiped film evaporator (see Example 1).

U.S. Pat. Nos. 5,051,152 and 5,202,001 disclose improved processes for reducing the amount of residual toluene diisocyanate in a polyurethane prepolymer reaction product mixture. The prepolymer is prepared by reacting an organic polyisocyanate with a polyol by conventional procedures. It is preferred that the NCO:OH equivalent ratio be in excess of about 2:1. This process comprises passing the prepolymer reaction product mixture through a wiped film evaporator, while adding an inert gas, specifically nitrogen, to the distillation process to sweep out the polyisocyanate to yield a prepolymer product containing less than about 0.1% by wt. of residual diisocyanate, preferably toluene diisocyanate (TDI). The inert gas, preferably nitrogen, is passed in a countercurrent flow through the evaporation zone at a specified ratio of mass flow rate of inert gas to mass flow rate of prepolymer.

U.S. Pat. No. 5,646,230 is directed to isocyanate-terminated prepolymers having a viscosity of less than about 6000 mPa s, preferably less than about 3500 mPa.s at 80° C. and an NCO content of about 3 to 10%. These prepolymers comprise the reaction product of a) an aromatic diisocyanate, b) a polyether polyol having an OH number of about 25 to 125 and containing from about 1.8 to 2.5 hydroxyl groups, and c) an aliphatic diisocyanate. In the preparation of the prepolymer, the equivalents ratio of the polyether polyol to aromatic diisocyanate is from about 1.0:0.7 to 1.0:1.1, and the total ratio of equivalents of isocyanate to polyol in the prepolymer is from about 2:1 to 4:1. The preferred aromatic diisocyanate is 4,4'-diphenylmethane diisocyanate, and the preferred aliphatic diisocyanate is bis-(4-isocyanatocyclohexyl)-methane. All of the working examples use this combination of diisocyanates in the prepolymers of this application.

Advantages of the low-viscosity, low monomeric TDI containing prepolymers of the present invention include the fact that highly flexible elastomers and binders can be produced from these. The prepolymers of the present invention can not be obtained by the standard one-step process which involves charging a polyol (or a mixture of polyols) to a reactor containing a mixture of TDI and MDI (and/or polymeric MDI) with stirring and heating until the reaction is complete. Prepolymers made by this process will always exhibit unacceptably high monomeric TDI contents.

TDI based prepolymers are desirable because they result in the lowest viscosity at a given NCO-content when compared to other diisocyanates. However, these prepolymers also contain high concentrations of free TDI monomer that are objectionable from an industrial hygiene standpoint. Reducing the concentration of free TDI monomer by a thin film evaporation process is both costly, and results in a higher viscosity product.

Diphenylmethane diisocyanate (MDI) or polymeric MDI based prepolymers prepared from polyethers are not acceptable because of the high viscosity or even solid nature of the prepolymers and the lack of high flexibility in elastomers produced from polymeric MDI prepolymers.

Prepolymers prepared by reacting 1) a polyol with 2) a mixture of TDI and MDI (4,4'-MDI) are also unacceptable. Due to the high reactivity of MDI vs. TDI, this process forms a prepolymer which contains the MDI/polyether adducts and a high concentration of free TDI monomer. Furthermore, elastomers produced from these prepolymers are not highly flexible.

SUMMARY OF THE INVENTION

This invention relates to liquid toluene diisocyanate/polyether/polymethylene poly(phenylisocyanate) prepolymers having an NCO content of from 2 to 20%, preferably 4 to 15% and most preferably 8 to 12%, a viscosity of about 10,000 mpa.s or less, preferably about 6,000 mPa.s or less and most preferably about 3,000 mPa.s or less at 25° C., and which contain about 1.0% or less, preferably about 0.5% or less and most preferably about 0.3% or less of monomeric TDI. These prepolymers are prepared by mixing A) a TDI isocyanate-terminated prepolymer having a low NCO content and which is the reaction product of 1) 2,4-toluene diisocyanate and 2) at least one high molecular weight polyether polyol, with B) a liquid polyisocyanate of the diphenylmethane series.

The present invention also relates to a process for the preparation of these liquid toluene diisocyanate/polyether/polymethylene poly(phenylisocyanate) prepolymers.

More specifically, the presently claimed liquid toluene diiso-cyanate/polyether/polymethylene poly (phenylisocyanate) prepolymers are prepared by mixing:

A) 13 to 98 parts by weight of a TDI isocyanate-terminated prepolymer having an NCO content of about 3.2% or less, preferably about 2.5% or less and most preferably less than about 2.0%, and which is prepared by reacting:

1) 2,4-toluene diisocyanate, and 2) at least one polyether polyol having a number average molecular weight of at least about 3000 up to about 8000, preferably of at least about 4000 up to about 8000, containing two hydroxyl groups, and being the reaction product of:

a) an alkylene oxide (preferably propylene oxide), and b) one or more starter compounds containing at least 2 carbon atoms, at an NCO:OH ratio of about 1.3 to about 2.3, preferably of about 1.7 to 2.0;

with

B) 2 to 87 parts by weight of a liquid polyisocyanate of the diphenylmethane series having an NCO content of from 18 to 33.6%, wherein the parts by weight of A) and B) total 100 parts by weight.

The process of the present invention comprises mixing:

A) 13 to 98 parts by weight of a TDI isocyanate-terminated prepolymer having an NCO content of about 3.2% or less, preferably about 2.5% or less and most preferably less than about 2.0%, and which is prepared by reacting:

1) 2,4-toluene diisocyanate, and
2) at least one polyether polyol having a number average molecular weight of at least about 3000 up to about 8000, preferably of at least about 4000 up to about 8000, containing two hydroxyl groups, and being the reaction product of:
   a) an alkylene oxide (preferably propylene oxide), and
   b) one or more starter compounds containing at least 2 carbon atoms, at an NCO:OH ratio of about 1.3 to about 2.3, preferably of about 1.7 to 2.0;

with

B) 2 to 87 parts by weight of a liquid polyisocyanate of the diphenylmethane series having an NCO content of from 18 to 33.6%, wherein the parts by weight of A) and B) total 100 parts by weight.

In accordance with the present invention, the preferred polyether polyols to be used in the preparation of A) the TDI isocyanate-terminated prepolymer are those having a number average molecular weight of at least about 3000 up to about 8000. It is particularly preferred that these polyether polyols are the reaction product of a) propylene oxide with b) one or more starter compounds containing at least 2 carbon atoms.

Preferred liquid polyisocyanates of the diphenylmethane series for the present invention include 4,4'-diphenylmethane diisocyanate, polymethylene poly (phenylisocyanate), and an isomeric mixture of diphenylmethane diisocyanate. These liquid polyisocyanates have an NCO content of from about 18 to about 33.6%, preferably from about 23 to about 33.6%, and most preferably from about 30 to about 33.6%.

DETAILED DESCRIPTION OF THE INVENTION

Suitable TDI isocyanate-terminated prepolymers, component A) of the present invention, have an NCO content of about 3.2% or less, preferably about 2.5% or less and most preferably about 2.0% or less. These TDI isocyanate-terminated prepolymers are prepared by reacting: 1) 2,4-toluene diisocyanate, and 2) at least one polyether polyol.

Suitable polyether polyols to be used for the preparation of the A) TDI isocyanate-terminated prepolymers include those polyether polyols which have a number average molecular weight of at least about 3000 up to about 8000, and contain two hydroxyl groups. These polyether polyols are prepared by the reaction of an alkylene oxide such as, for example, ethylene oxide, propylene oxide, butylene oxide, etc., with a suitable starter compound. The alkylene oxides may be used either singularly, alternatingly in succession, or as mixtures. Propylene oxide is a preferred alkylene oxide in the present invention. Suitable starter compounds include those compounds containing at least 2 carbon atoms such as, for example, ethylene glycol, 1,2-propylene glycol, 1,3-propylene glycol, butylene glycol, neopentyl glycol, etc, and mixtures thereof. Starter compounds containing at least 2 carbon atoms are suitable to be used either alone or as mixtures with other starter compounds. It is also possible that starter compounds containing at least 2 carbon atoms can be used as mixtures with, for example, water (in small quantities) in forming the polyether polyols for the present invention.

It is preferred that starter compounds comprise a mixture of at least one starter compound containing 2 carbon atoms and at least one starter compound containing 3 carbon atoms. It is more preferred that starter compounds for the preparation of component A) the TDI isocyanate-terminated prepolymers are those compounds having 3 carbon atoms. A most preferred starter compound is 1,2-propylene glycol.

The TDI isocyanate-terminated prepolymers A) of the present invention can be prepared using any of the known processes in the art for producing NCO-terminated prepolymers. These processes include, for example, adding the polyether polyol, at temperatures of from about, for example, 25° to 80° C., to the 2,4-toluene diisocyanate, at temperatures of from about, for example, 25° to 80° C., as fast as possible, or over an extended addition time such as, for example, up to 24 hours with heating or cooling to maintain the reaction temperature between 25° and 100° C. until the reaction is complete. This may take, for example, anywhere from around about 1 hour up to around about 24 hours. It is also possible, for example, to add the 2,4-toluene diiso-cyanate at temperatures of from about, for example, 25° to 80° C. to the polyether polyol at temperatures of from about, for example 25° to 80° C. at a rapid rate with heating or cooling to maintain the reaction temperature between, for example, 25° and 100° C., until the reaction is completed. Preferably, this takes, for example, from about 4 to about 20 hours.

Another suitable process includes adding the polyether polyol, at temperatures of from about, for example, 25° to 80° C., and the 2,4-toluene diisocyanate, at temperatures of from about, for example, 25° to 80° C., to a reactor (or mixing chamber) at the same time, followed by heating or cooling at temperatures between 25° and 100° C., until the reaction is complete.

Suitable liquid polyisocyanates of the diphenylmethane series include those compounds having an NCO content of from about 18 to about 33.6%. As used herein, the phrase "polyisocyanates of the diphenylmethane series" refers to any of the various isomeric mixtures of diphenylmethane diisocyanates and/or polymeric MDI. Polymeric MDI refers to three-ring, four-ring and higher ring polyisocyanate compounds, and mixtures of these higher ring compounds. MDI is produced by the condensation of aniline with formaldehyde, followed by phosgenation. This condensation results in the various isomers of MDI (i.e. 2,2'-2,4'- and 4,4'-MDI) as well as condensation products containing more than two aromatic rings, i.e. three-ring and other higher ring compounds.

Preferred polyisocyanates of the diphenylmethane series are 4,4'-diphenylmethane diisocyanate; an isomeric mixture of diphenylmethane diisocyanate containing 30 to 98% by weight of the 4,4'-isomer, 2 to 70% by weight of the 2,4'-isomer and 0 to 5% by weight of the 2,2'-isomer (with the %'s by weight totaling 100%); and polymethylene poly-(phenylisocyanate) having an average isocyanate functionality of about 2.1 to 3.5, an isocyanate group content of about 18.0 to about 33.6, and containing about 30 to 96% by weight of monomeric 4,4'-MDI, about 2 to about 70% by weight of monomeric 2,4'-MDI and less than 5% by weight of monomeric 2,2'-MDI, and from about 2 to 60% by weight of higher ring homologues of the MDI series (with the %'s by weight totaling 100%).

The liquid prepolymers of the present invention are prepared by first forming a TDI isocyanate terminated prepolymer by reacting 2,4-toluene diisocyanate with one or more polyether polyols at an NCO:OH ratio of about 2.0 over a 5 to 16 hour period at about 60° to about 80° C., to attain a final NCO content of about 2%. These prepolymers are then mixed with a suitable liquid polyisocyanate of the diphenylmethane series at a temperature of, for example, about 60° to about 80° C. for a time period of at least 0.5 hours. This results in a final product (i.e. a toluene diisocyanate/polyether/polymethylene poly (phenylisocyanate) prepolymer) which contains about 10% NCO.

As used herein, the term liquid means a prepolymer which flows freely having a viscosity of less than 10,000 mPa.s at 25° C.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the examples:

Polyol A: a propylene glycol started propylene oxide/ethylene oxide (wt. ratio of PO:EO of 80:20) polyether having a functionality of 2, a molecular weight of about 4000, an OH number of about 28, and containing greater than about 90% of primary OH.

Polyol B: a propylene glycol started propylene oxide/ethylene oxide (wt. ratio of PO:EO of 87:13) polyether having a functionality of 2, a molecular weight of about 4000, an OH number of about 28, and containing from about 70–80% of primary OH.

Polyol C: a propylene glycol started propylene oxide polyether having a functionality of 2, a molecular weight of about 4000, an OH number of about 28.

TDI: 2,4-toluene diisocyanate

ISO A: diphenylmethane diisocyanate having an NCO content of about 33.6% and a functionality of about 2.0, which comprises about 43% by weight of 4,4'-MDI, 55% by weight of 2,4'-MDI and 2% by weight of 2,2'-MDI.

ISO B: a polymethylene poly(phenylisocyanate) having an NCO content of about 33.4%, a functionality of about 2.1, and containing about 94% by weight of monomeric MDI, which is made up of 45% by weight of 4,4'-MDI, 47% by weight of 2,4'-MDI and 2% by weight of 2,2'-MDI. This polymethylene poly(phenylisocyanate) also contains about 6% by weight of higher ring homologues of the MDI series.

ISO C: a polymethylene poly(phenylisocyanate) having an NCO content of about 33.2%, a functionality of about 2.2 and containing about 89% by weight of monomeric MDI, which is made up of 50% by weight of 4,4'-MDI, 37% by weight of 2,4'-MDI and 2% by weight of 2,2'-MDI. This polymethylene poly(phenylisocyanate) also contains about 11% by weight of higher ring homologues of the MDI series.

ISO D: a polymethylene poly(phenylisocyanate) having an NCO content of about 33.1%, a functionality of about 2.2 and containing about 86% by weight of monomeric MDI, which is made up of 44% by weight of 4,4'-MDI, and 42% by weight of 2,4'-MDI. This polymethylene poly(phenylisocyanate) also contains about 14% by weight of higher ring homologues of the MDI series.

ISO E: a polymethylene poly(phenylisocyanate) having an NCO content of about 32.8%, a functionality of about 2.3 and containing about 78% by weight of monomeric MDI, which is made up of 55% by weight of 4,4'-MDI, 20% by weight of 2,4'-MDI and 3% by weight of 2,2'-MDI. This poly-methylene poly(phenylisocyanate) also contains about 22% by weight of higher ring homologues of the MDI series.

Isocyanates A through E above were used as component B) in the presently claimed invention. Table 1 below sets forth the %NCO, average functionality, monomeric diisocyanate content and isomer distribution for MDI based Isocyanates A through E.

TABLE 1

| | | | Properties of MDI Based Polyisocyanates A through E | | | | |
|---|---|---|---|---|---|---|---|
| ISO | % NCO | avg. funct. | monomeric MDI (%)[b] | 4,4'-MDI[a] (%) | 2,4'-MDI[a] (%) | 2,2'-MDI[a] (%) | Polymeric MDI (%)[b] |
| A | 33.6 | 2.0 | 100 | 43 | 55 | 2 | 0 |
| B | 33.4 | 2.1 | 94 | 45 | 47 | 2 | 6 |
| C | 33.2 | 2.2 | 89 | 50 | 37 | 2 | 11 |
| D | 33.1 | 2.2 | 86 | 44 | 42 | 0 | 14 |
| E | 32.8 | 2.3 | 78 | 53 | 22 | 3 | 22 |

[a]the sum of 4,4'-MDI plus 2,4'-MDI plus 2,2'-MDI equals the % monomeric MDI content
[b]the sum of the % by weight monomeric MDI plus % by weight polymeric MDI totals 100% by weight The liquid, low-viscosity prepolymers of the present invention were prepared according to the following general procedure:

GENERAL PROCEDURE

First, a TDI isocyanate-terminated prepolymer (i.e. component A) of the present invention) was prepared by charging the appropriate amount of TDI (see Table 2) into a clean, dry 5-liter, 3-neck flask equipped with an overhead stirring unit, a thermocouple and a nitrogen inlet. The flask was held at 25° C. or 50° C. prior to charging the polyol (Table 2). Then, the polyol, having a temperature of either 25° C. or 50° C. (Table 2), was charged to the flask containing the TDI at such a rate that the reaction temperature during the addition did not exceed 60° C. After all the polyol was charged to the flask, the reaction mixture was maintained at about 60° C. for about 16 hours or at about 80° C. for either 5 hours or for 16 hours (Table 2). A TDI isocyanate-terminated prepolymer (i.e. component A) of the claimed invention) was the resultant product.

Table 2 below sets forth the individual components and their relative quantities and process conditions which were used in the process described above to form the TDI isocyanate-terminated prepolymers (i.e. component A) of the present invention), and the % NCO of these isocyanate-terminated prepolymers.

Next, an MDI based polyisocyanate (i.e. component B) of the present invention was added at room temperature to the TDI isocyanate-terminated prepolymer (i.e. component A)) produced above. (The TDI isocyanate-terminated prepolymers from Examples 1–8 in Table 2 were used respectively in Examples 1–8 in Table 3.) The mixture was heated to a temperature in the range of about 60° to about 80° C. for about 30 minutes. The resultant final prepolymer (i.e. the TDI/polyether/poly-methylene poly(phenylisocyanate) prepolymer) was then poured into a suitable container and the following properties of these final prepolymers were determined: % NCO content, viscosity at 25° C., and % free TDI monomer content.

Table 3 below sets forth the TDI prepolymers (i.e. component A) of the invention) and the MDI isocyanate components (i.e. component B) of the present invention) and their relative quantities, and the process conditions which were used to form the claimed TDI/polyether/polymethylene poly(phenylisocyanate) prepolymers. Table 4 sets forth the properties of these TDI/polyether/polymethylene poly(phenylisocyanate) prepolymers, as well as their appearance.

A moisture cured film was also prepared from these prepolymers (see Examples 1, 3, 5, 7 and 8 below). Film properties were also determined and are set forth in Table 5 below.

TABLE 2

TDI Isocyanate-Terminated Prepolymers (Component A) of the invention)

| Example | TDI (pbw) | TDI temp.(°C.) | Polyol | Polyol (pbw) | Polyol temp (°C.) | Rxtn. temp.(°C.) | Rxtn. time (hrs) | % NCO[a] |
|---|---|---|---|---|---|---|---|---|
| 1 | 240 | 50 | A | 2750 | 50 | 60 | 16 | 2.1 |
| 2 | 239 | 50 | A | 2738 | 50 | 60 | 16 | 2.1 |
| 3 | 239 | 50 | A | 2738 | 50 | 60 | 16 | 2.1 |
| 4 | 240 | 50 | A | 2750 | 50 | 80 | 16 | 2.0 |
| 5 | 239 | 25 | A | 2730 | 25 | 80 | 5 | 2.08 |
| 6 | 249 | 50 | A | 2715 | 50 | 60 | 16 | 2.1 |
| 7 | 253 | 25 | B | 2706 | 25 | 80 | 16 | 1.98 |
| 8 | 240 | 25 | C | 2711 | 25 | 80 | 16 | 1.9 |

[a]% NCO of TDI Isocyanate-Terminated Prepolymers

TABLE 3

Addition of MDI Based Polyisocyanates (i.e. Component B) of the Invention) to the TDI Isocyanate-Terminated Prepolymers, i.e. Component A), of Table 2

| Example | TDI NCO-terminated prepolymer (pbw) | MDI ISO | MDI ISO (pbw) | MDI ISO temp. (°C.) | Mixture temp. (°C.) | Mix time (hrs) |
|---|---|---|---|---|---|---|
| 1 | 2990 | A | 1010 | 25 | 60 | 0.5 |
| 2 | 2977 | B | 1023 | 25 | 60 | 0.5 |
| 3 | 2977 | C | 1023 | 25 | 60 | 0.5 |
| 4 | 2990 | D | 1010 | 25 | 80 | 0.5 |
| 5 | 2969 | E | 1031 | 25 | 80 | 0.5 |
| 6 | 2964 | E | 10361 | 25 | 60 | 0.5 |
| 7 | 2959 | E | 1041 | 25 | 80 | 0.5 |
| 8 | 2951 | E | 1049 | 25 | 80 | 0.5 |

TABLE 4

Properties of TDI/Polyether/MDI Prepolymers in Table 3

| Example | Appearance | % NCO | Viscosity (mPa.s at 25° C.) | Free monomeric TDI (%) |
|---|---|---|---|---|
| 1 | clear | 9.88 | 1824 | 0.3 |
| 2 | clear | 9.72 | 1809 | 0.3 |
| 3 | clear | 9.84 | 1868 | 0.3 |
| 4 | slightly turbid | 9.72 | 2920 | 0.3 |
| 5 | clear | 10.06 | 1962 | 0.3 |
| 6 | clear | 9.87 | 2325 | 0.3 |
| 7 | slightly turbid | 10.16 | 2035 | 0.3 |
| 8 | slightly turbid | 10.21 | 1860 | 0.2 |

TABLE 5

Properties of Films produced from the TDI/Polyether/MDI Prepolymers of Table 4

| Example | Appearance | Elongation (%) | Tensile Strength (psi) |
|---|---|---|---|
| 1 | clear | 646 | 5365 |
| 3 | clear | 344 | 2267 |
| 5 | clear | 228 | 2091 |
| 7 | clear | 277 | 2480 |
| 8 | hazy | 325 | 1522 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid toluene diisocyanate/polyether/polymethylene poly(phenylisocyanate) prepolymer having an NCO content of from 2 to 20%, a viscosity of about 10,000 mPa.s or less at 25° C., and containing about 1.0% or less of monomeric TDI, wherein said prepolymer is prepared by mixing:

A) 13 to 98 parts by weight of a TDI isocyanate-terminated prepolymer having an NCO content of about 3.2% or less, and which is prepared by reacting:
   1) 2,4-toluene diisocyanate, and
   2) at least one polyether polyol having a number average molecular weight of at least about 3000 up to about 8000, containing two hydroxyl groups, and being the reaction product of
      a) an alkylene oxide, with
      b) one or more starter compounds containing at least 2 carbon atoms, at an NCO:OH ratio of about 1.3 to about 2.3;

with

B) 2 to 87 parts by weight of a liquid polyisocyanate of the diphenylmethane series having an NCO content of from 18 to 33.6%, wherein the parts by weight of A) and B) total 100 parts by weight.

2. The liquid toluene diisocyanate/polyether/polymethylene poly(phenylisocyanate) prepolymer of claim 1, wherein said prepolymer has an NCO content of from 4 to 15%, a viscosity of about 6,000 mPa.s or less at 25° C., and a free monomeric TDI content of about 0.5% or less.

3. The liquid toluene diisocyanate/polyether/polymethylene poly(phenylisocyanate) prepolymer of claim 1, wherein said prepolymer has an NCO content of from 8 to 12%, a viscosity of about 3,000 mPa.s or less at 25° C., and a monomeric TDI content of about 0.3% or less.

4. The liquid toluene diisocyanate/polyether/polymethylene polyisocyanate prepolymer of claim 1, wherein A) said TDI isocyanate-terminated prepolymer has an NCO content of about 2.5% or less, and is prepared by reacting: 1) 2,4-toluene diisocyanate, and 2) at least one polyether polyol having a number average molecular weight of at least about 4000 up to about 8000, containing two hydroxyl groups.

5. The liquid toluene diisocyanate/polyether/polymethylene poly(phenylisocyanate) prepolymer of claim 1, wherein A)2) said polyether polyol comprises the reaction product of a) propylene oxide, and b) one or more starter compounds containing at least 2 carbon atoms.

6. The liquid toluene diisocyanate/polyether/polymethylene poly(phenylisocyanate) prepolymer of claim 5, wherein A)2) said polyether polyol comprises the reaction product of a) propylene oxide, and b) 1,2-propylene glycol.

7. The liquid toluene diisocyanate/polyether/polymethylene poly(phenylisocyanate) prepolymer of claim 1, wherein B) said liquid polyisocyanate of the diphenylmethane series has an NCO content of from about 23 to about 33.6%.

8. The liquid toluene diisocyanate/polyether/polymethylene poly(phenylisocyanate) prepolymer of claim 1, wherein B) said liquid polyisocyanate of the diphenylmethane series has an NCO content of from about 30 to 33.6%.

9. The liquid toluene diisocyanate/polyether/polymethylene poly(phenylisocyanate) prepolymer of claim 1, wherein B) said liquid polyisocyanate of the diphenylmethane series comprises about 30 to about 98% by weight of the 4,4'-isomer of MDI, about 2 to about 70% by weight of the 2,4'-isomer of MDI and about 0 to about 5% by weight of the 2,2'-isomer of MDI, with the %'s by weight totaling 100%.

10. The liquid toluene diisocyanate/polyether/polymethylene poly(phenylisocyanate) prepolymer of claim 1, wherein B) said liquid polyisocyanate of the diphenylmethane series has an average isocyanate functionality of about 2.1 to about 3.5, and comprises about 30 to about 96% by weight of monomeric 4,4'-MDI, about 2 to about 70% by weight monomeric 2,4'-MDI and less than 5% by weight of monomeric 2,2'-MDI, and from about 2 to about 60% by weight of higher ring homologues of the MDI series.

11. A process for the preparation of a liquid toluene diisocyanate/polyether/polymethylene poly (phenylisocyanate) prepolymer having an NCO content of from 2 to 20%, a viscosity of about 10,000 mPa.s or less at 25° C., and containing about 1.0% or less of monomeric TDI, comprising mixing:

A) 13 to 98 parts by weight of a TDI isocyanate-terminated prepolymer having an NCO content of about 3.2% or less, and which is prepared by reacting:
   1) 2,4-toluene diisocyanate, and
   2) at least one polyether polyol having a number average molecular weight of at least about 3000 up to about 8000, containing two hydroxyl groups, and being the reaction product of:
      a) an alkylene oxide, with
      b) one or more starter compounds containing at least 2 carbon atoms, at an NCO:OH ratio of about 1.3 to about 2.3;

with

B) 2 to 87 parts by weight of a liquid polyisocyanate of the diphenylmethane series having an NCO content of from 18 to 33.6%, wherein the parts by weight of A) and B) total 100 parts by weight.

12. The process of claim 11, wherein said liquid toluene diisocyanate/polyether/polymethylene poly (phenylisocyanate) prepolymer has an NCO content of from 4 to 15%, a viscosity of about 6,000 mPa.s or less at 25° C., and a monomeric TDI content of about 0.5% or less.

13. The process of claim 11, wherein said liquid toluene diisocyanate/polyether/polymethylene poly (phenylisocyanate) prepolymer has an NCO content of from 8 to 12%, a viscosity of about 3,000 mPa.s or less at 25° C., and a monomeric TDI content of about 0.3% or less.

14. The process of claim 11, wherein A) said TDI isocyanate-terminated prepolymer has an NCO content of about 2.5% or less, and is prepared by reacting: 1) 2,4-toluene diisocyanate, and 2) at least one polyether polyol having a number average molecular weight of at least about 4000 up to about 8000, containing two hydroxyl groups.

15. The process of claim 11, wherein A)2) said polyether polyol comprises the reaction product of a) propylene oxide, and b) one or more starter compounds containing at least 2 carbon atoms.

16. The process of 15, wherein A)2) said polyether polyol comprises the reaction product of a) propylene oxide, and b) 1,2-propylene glycol.

17. The process of claim 11, wherein B) said liquid polyisocyanate of the diphenylmethane series has an NCO content of from about 23 to about 33.6%.

18. The process of claim 11, wherein B) said liquid polyisocyanate of the diphenylmethane series has an NCO content of from about 30 to 33.6%.

19. The process of claim 11, wherein B) said liquid polyisocyanate of the diphenylmethane series comprises about 30 to about 98% by weight of the 4,4'-isomer of MDI, about 2 to about 70% by weight of the 2,4'-isomer of MDI and about 0 to about 5% by weight of the 2,2'-isomer of MDI, with the %'s by weight totaling 100%.

20. The process of claim 11, wherein B) said liquid polyisocyanate of the diphenylmethane series has an average isocyanate functionality of about 2.1 to about 3.5, and comprises about 30 to about 96% by weight of monomeric 4,4'-MDI, about 2 to about 70% by weight monomeric 2,4'-MDI and less than 5% by weight of monomeric 2,2'-MDI, and from about 2 to about 60% by weight of higher ring homologues of the MDI series.

* * * * *